(12) United States Patent
Kuehlewind et al.

(10) Patent No.: US 8,964,755 B2
(45) Date of Patent: Feb. 24, 2015

(54) OBTAINING INFORMATION FROM DATA ITEMS

(71) Applicant: BRITISH TELECOMMUNICATIONS public limited company, London (GB)

(72) Inventors: Mirja Kuehlewind, Stuttgart (DE); Robert John Briscoe, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/369,481

(22) PCT Filed: Dec. 20, 2012

(86) PCT No.: PCT/GB2012/000918
§ 371 (c)(1),
(2) Date: Jun. 27, 2014

(87) PCT Pub. No.: WO2013/098540
PCT Pub. Date: Jul. 4, 2013

(65) Prior Publication Data
US 2015/0030028 A1    Jan. 29, 2015

(30) Foreign Application Priority Data

Dec. 30, 2011    (EP) .................................. 11250952

(51) Int. Cl.
*H04L 12/28*    (2006.01)
*H04L 12/56*    (2006.01)
(52) U.S. Cl.
USPC ..................................................... 370/392
(58) Field of Classification Search
CPC ...... H04L 45/00; H04L 47/10; H04L 29/0653
USPC .................................................. 370/389, 392
See application file for complete search history.

(56) References Cited

U.S. PATENT DOCUMENTS 4,751,669 A * 6/1988 Sturgis et al. ................ 345/635
5,850,388 A   12/1998 Anderson et al.
(Continued)

FOREIGN PATENT DOCUMENTS

WO    WO 97/37310     10/1997
WO    2012/117215     9/2012

OTHER PUBLICATIONS

U.S. Appl.No. 14/000,546, filed Aug. 20, 2013.
(Continued)

*Primary Examiner* — Ronald Abelson
(74) *Attorney, Agent, or Firm* — Nixon & Vanderhye P.C.

(57) ABSTRACT

Methods and apparatus are disclosed for obtaining information from one or more headers of a data item transmitted via a communication network, a predetermined portion of at least one header carrying a symbol or combination of symbols having a first pre-defined meaning according to a first pre-defined communication protocol. The method comprises inspecting at least one header of a received data item whereby to identify the symbol or combination of symbols carried by the predetermined portion thereof; identifying whether at least one other portion of a header of the data item is carrying the same symbol or combination of symbols; and in the event that it is identified that at least one other portion of a header of the data item is carrying the same symbol or combination of symbols, 'interpreting and/or processing at least one of the one or more headers according to a second pre-defined communication protocol, the second communication protocol differing from the first communication protocol.

14 Claims, 4 Drawing Sheets

| TCP header | | | |
|---|---|---|---|
| 8 | 10 | TSval-r | TSecr-r |
| 8 | 10 | TSval-s | TSecr-s |

Repeated TCP Timestamp Option (TSopt) headers

(56) References Cited

U.S. PATENT DOCUMENTS

| | | | |
|---|---|---|---|
| 6,418,480 | B1 | 7/2002 | Rijhsinghani et al. |
| 6,680,952 | B1* | 1/2004 | Berg et al. ............ 370/467 |
| 7,342,892 | B2 | 3/2008 | Soon et al. |
| 2002/0103937 | A1 | 8/2002 | Tillmann et al. |
| 2004/0001443 | A1 | 1/2004 | Soon et al. |
| 2004/0062246 | A1 | 4/2004 | Boucher et al. |
| 2005/0132244 | A1* | 6/2005 | Milway ............ 713/400 |
| 2008/0037420 | A1 | 2/2008 | Tang |
| 2009/0006711 | A1* | 1/2009 | Biran et al. ............ 710/316 |
| 2009/0075633 | A1* | 3/2009 | Lee et al. ............ 455/412.2 |
| 2009/0182894 | A1* | 7/2009 | Vasseur et al. ............ 709/239 |
| 2010/0135302 | A1* | 6/2010 | Ra et al. ............ 370/392 |
| 2010/0321716 | A1* | 12/2010 | Takeo ............ 358/1.14 |
| 2011/0142069 | A1* | 6/2011 | Loprieno et al. ............ 370/466 |
| 2011/0206048 | A1* | 8/2011 | Maeda ............ 370/392 |
| 2013/0329739 | A1 | 12/2013 | Briscoe |

OTHER PUBLICATIONS

International Search Report for PCT/GB2012/000918, mailed Mar. 22, 2013.

Written Opinion of the International Searching Authority for PCT/GB2012/000918, mailed Mar. 22, 2013.

EP Search Report for EP Application No. 11250952, dated Jun. 13, 2012.

Kuehlewind & Briscoe: "Chirping for Congestion Control—Implementation Feasibility": http://pfld.net/2010/paper/session2-3.pdf, [NN This comes from the following: Proc. 8th International Workshop on Protocols for Future, Large-Scale & Diverse Network Transports (PFLDNeT), (Nov. 2010), 7 pages.

Van Jacobson, R. Braden, D. Borman: "TCP Extensions for High Performance": http://tools.ietf.org/pdf/rfc1323.pdf, (May 1992), 37 pages.

Scheffenegger & Kuehlewind: "Additional negotiation in the TCP Timestamp Option field during the TCP handshake", (Mar. 14, 2011), (draft-scheffenegger-tcpm-timestamp-negotiation-01): http://tools.ietf.org/pdf/draft-scheffenegger-tcpm-timestamp-negotiation-01.pdf, 12 pages.

F. Gont: "Security Assessment of the Transmission Control Protocol (TCP)", IETF Internet Draft <draft-ietf-tcpm-tcp-security-02.txt> (Jan. 21, 2011): http://tools.ietf.org/pdf/draft-ietf-tcpm-tcp-security-02.pdf, 114 pages.

A. Yourtchenko: "Introducing TCP Long Options by Invalid Checksum" IETF, Internet Draft <draft-yourtchenko-tcp-loic-00> (Apr. 2011): http://tools.ietf.org/pdf/draft-yourtchenko-tcp-loic-00.pdf, 5 pages.

* cited by examiner

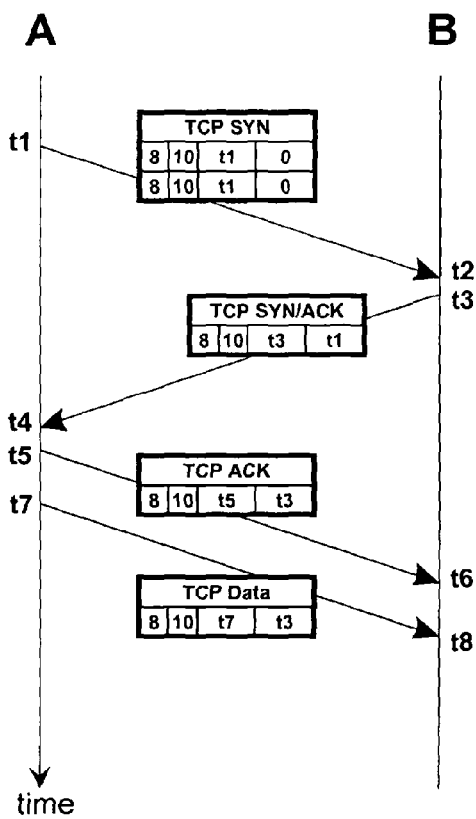
Figure 1(a) – Repeated TCP Timestamp Option (TSopt) headers
Figure 1(b) – TCP Timestamp Option Sequence Diagram: Updated Originator (A) and Traditional Responder (B)
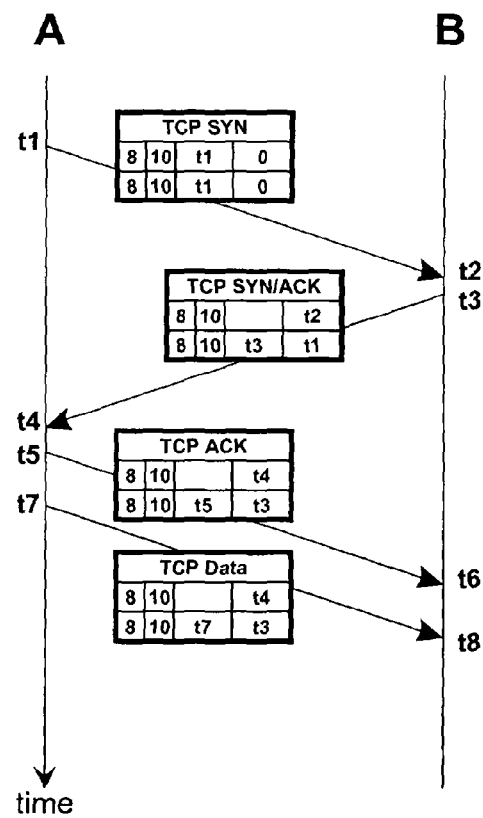
Figure 1(c) – TCP Timestamp Option Sequence Diagram: Updated Originator (A) and Updated Responder (B)

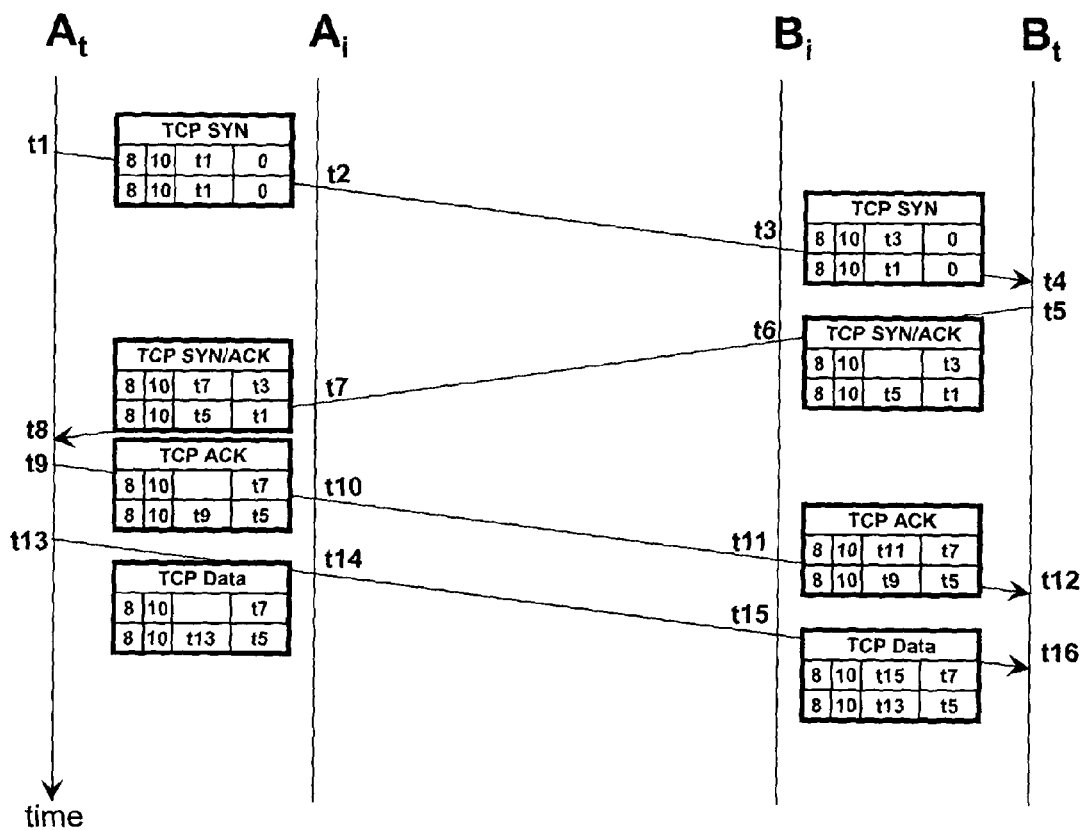
Figure 2 – TCP Timestamp Option Sequence Diagram: passing through Transport ($A_t$) and NIC ($A_i$) on host A then NIC ($B_i$) and Transport ($B_t$) on host B.

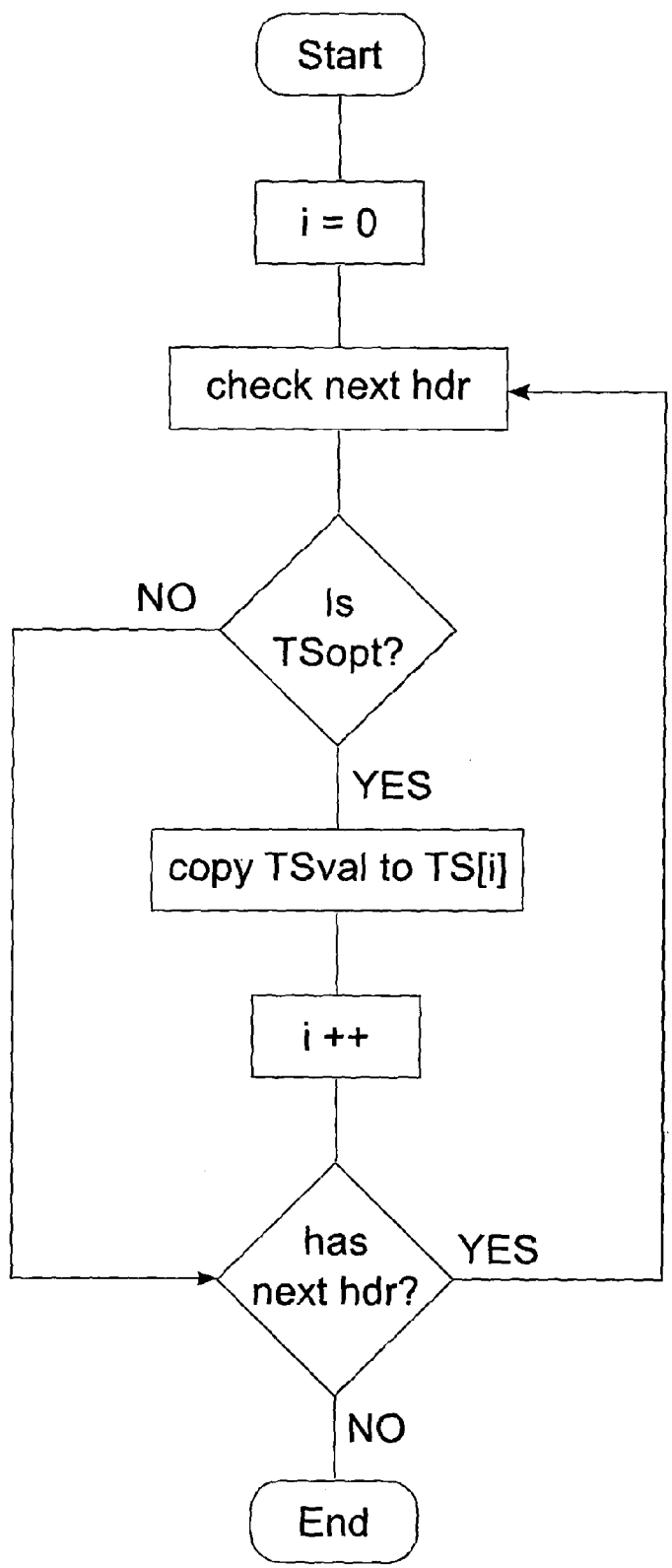
Figure 3 – Flow diagram
for reading timestamp values from a packet on reception

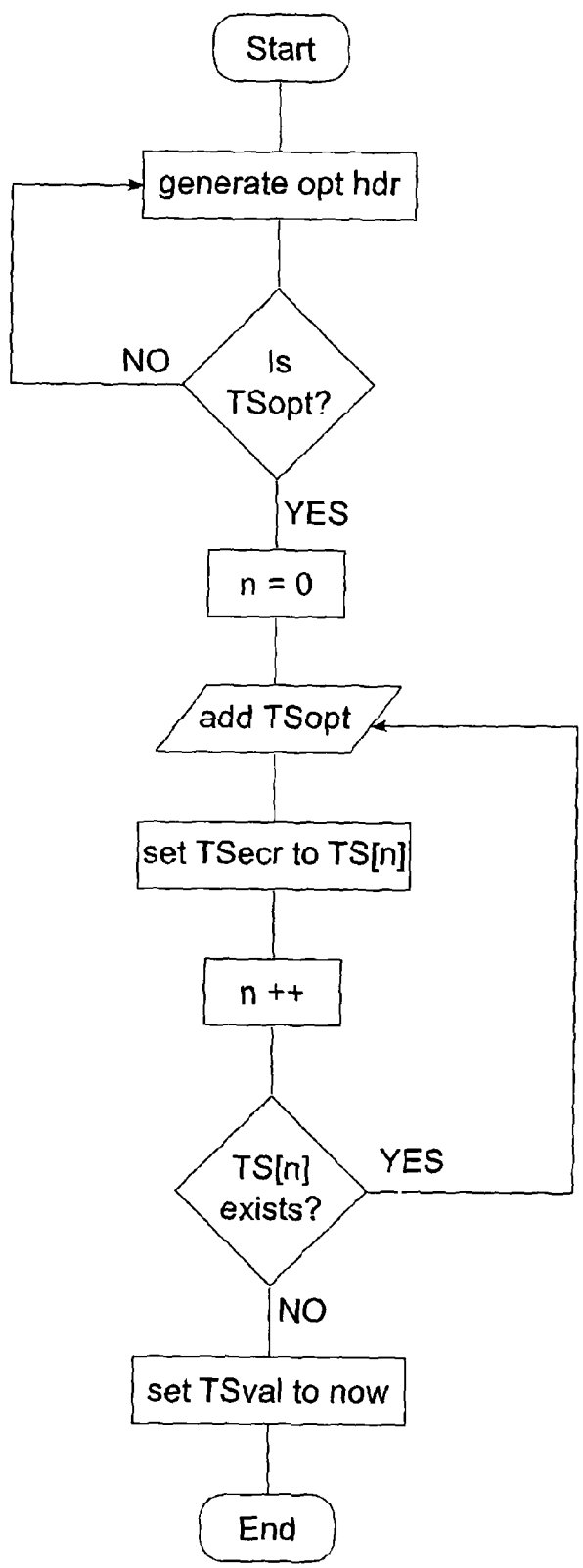
Figure 4 – Flow diagram for writing timestamp echo replies when sending a packet

OBTAINING INFORMATION FROM DATA ITEMS

This application is the U.S. national phase of International Application No. PCT/GB2012/000918, filed 20 Dec. 2012, which designated the U.S. and claims priority to EP Application No. 11250952.6, filed 30 Dec. 2011, the entire contents of each of which are hereby incorporated by reference.

TECHNICAL FIELD

The present invention relates to obtaining information from data items transmitted via a communication network. More specifically, aspects of the present invention relate to methods and apparatus for obtaining information from one or more headers of a data item transmitted via a communication network.

BACKGROUND TO THE INVENTION AND PRIOR ART

We start by presenting some basic concepts to facilitate the understanding of the mechanisms that are presented further on.

Packets, Frames, Segments, Headers and Payloads

A data sender usually splits data to be sent into small units known as packets. Each packet consists of a header and a payload carrying the data to be delivered. The header contains fields defined by the relevant communication protocol. Within the payload of a packet, there will often be a further header, itself encapsulating a further payload. For instance, the great majority of packets carried by commercial networks nowadays are so-called TCP/IP packets, where TCP is the Transmission Control Protocol and IP is the Internet Protocol. In these cases, the network layer IP header encapsulates a transport layer payload that starts with a TCP header which in turn encapsulates its payload.

Similarly, when a packet is transmitted over a communications link it will be encapsulated by a further header specific to the technology of the link in question. For instance, when a packet traverses an Ethernet link, an Ethernet header is added to encapsulate the IP packet, which becomes the payload.

The general term for these split-up units of data is a protocol data unit (PDU). PDUs at different layers of encapsulation are typically given different names. At the link, network and transport layers they are termed respectively frames, packets and segments (or datagrams).

As will later be understood, embodiments of the present invention could be applied at any of these levels (or possibly even at the application layer, although it may be easier to extend a protocol without relying on embodiments of the present invention at the application layer).

Protocol Evolution

From time to time, a new requirement has to be met, and can be achieved by updating part of a communications protocol, rather than completely replacing it. Most protocols are defined so that some values of various fields are not used, but are "reserved" for future use. The idea is that new features can be added by bringing values into use from these reserved ranges.

When reserved values are brought into use for a new variant of the protocol, things generally do not go as planned. Existing equipment built before the protocol was updated is usually meant to take some default action if it encounters a packet carrying one of the reserved values. When a reserved value starts to be used, however, it is generally discovered that some legacy equipment does not take the specified default action, possibly for one of the following three reasons:

- Precautionary security: some sites reject new-look packets as a potential security threat
- Bugs: the new packets trigger bugs in some equipment that was never tested for all possible future variants of the protocol
- Optimisation for the status quo: the new packets cannot be handled by hardware that has been optimised for the pre-existing protocol. So new packets have to be handled by software, which leads to a very high fraction of the newer packets being discarded because they cannot be processed fast enough.

Therefore, the first adopters of a new protocol typically discover that arbitrary equipment seems to crash inexplicably, or packets carrying new values never reach their destination because some item of equipment wrongly discards such packets (termed being black-holed).

The outcome is often that new features are not deployed, because no company wants to bear the cost of all the support calls that will result when their perfectly-implemented update is seen as the cause of numerous problems that it triggers—problems that are actually due to all the other incorrectly implemented equipment that has already been deployed.

EXAMPLE

The TCP Timestamp Option

To improve network performance, one current line of research is to send packets in 'chirps', which are groups of several packets within which the gap between packets progressively reduces (thus increasing the instantaneous bit-rate per packet). This is discussed in a paper referred to below as [Kuehlewind10]. The available bandwidth of a network path sets a lower limit on the gap between delivered packets, so packets sent closer together will build up a queue which will then drain at the available bandwidth. Therefore, by comparing the gaps between delivered packets with those between sent packets, the end-systems can identify the lower bound on the gap between packets and use this to estimate available bandwidth.

This promising technique can be used between two computers that have been modified to place the appropriate timestamps on packets and to echo the timestamps to the other end. However, widespread deployment of such a change is hampered by numerous 'middleboxes' between the end-systems that disrupt any attempt to use a new protocol.

One idea would be to use the existing facility in TCP to timestamp packets (see [TCP.timestamp] referred to below). The TCP timestamp is useful in this respect because it is specified in such a way that the receiver is meant to echo back to the sender whatever number the sender puts in the timestamp option field, without regard to its meaning.

However, the TCP timestamp option was designed to allow the sender to measure the two-way delay over the path, not the one-way delay as required for chirping to work. Also, a TCP receiver typically sends an acknowledgement every two packets, and the timestamp facility was designed to measure the delay from when the first packet was sent to when the acknowledgement of the second packet is received. Therefore, the TCP timestamp cannot be used for chirping without altering the semantics of the receiver as well as the sender.

It has recently been proposed to negotiate between the sender and receiver to alter the semantics of the TCP timestamp in order to repurpose it for chirping and other potential uses (see [TCP.ts.negotiate]). However, this negotiation results in an unusual initial packet, which is likely to encounter problems with middleboxes not specifically written to expect it (see [TCP.security]).

DISCUSSION OF PRIOR TECHNIQUE(S)

A technique proposed in an Internet Draft referred to below as [Yourtchenko11] involves use of a pair of connection initialisation packets the first of which conforms to existing standards while the second uses an updated protocol in an extension to the header that would confuse a legacy receiver. This second initialisation packet also uses a different checksum algorithm so that a legacy receiver will consider it invalid and discard it. The legacy receiver then treats the first packet as the only initialisation packet. However, an updated receiver will understand the new checksum algorithm and the new protocol, so it will be able to process the second initialisation packet. It will also understand the first packet.

U.S. Pat. No. 7,342,892 relates to establishing whether repetition of a header field is an error or attack, or whether the repetition is safe.

NON-PATENT REFERENCES

[Kuehlewind10]: Mirja Kühlewind (Uni Stuttgart) and Bob Briscoe (BT), "Chirping for Congestion Control—Implementation Feasibility" In Proc. Int'l Wkshp on Protocols for Future, Large-scale & Diverse Network Transports (PFLDNeT'10) (November 2010).

[TCP.timestamp]: V. Jacobson (LBL), R. Braden (ISI) and D. Borman (Cray Research), "TCP Extensions for High Performance," Internet Engineering Task Force RFC1323 (May 1992).

[TCP.ts.negotiate]: R. Scheffenegger (NetApp) and M. Kuehlewind (Uni Stuttgart) "Additional negotiation in the TCP Timestamp Option field during the TCP handshake" IETF Internet Draft <draftscheffenegger-tcpm-timestamp-negotiation-01> (14 Mar. 2011).

[TCP.security] F. Gont (UK CPNI) "Security Assessment of the Transmission Control Protocol (TCP)", IETF Internet Draft <draft-ietf-tcpm-tcp-security-02.txt> (21 Jan. 2011).

[Yourtchenko11]: A. Yourtchenko (Cisco), "Introducing TCP Long Options by Invalid Checksum" IETF Internet Draft <draft-yourtchenko-tcp-loic-00> (April 2011)

SUMMARY OF THE INVENTION

According to a first aspect of the present invention, there is provided a method of obtaining information from one or more headers of a data item transmitted via a communication network, a predetermined portion of at least one header carrying a symbol or combination of symbols having a first pre-defined meaning according to a first pre-defined communication protocol, the method comprising:

inspecting at (east one header of a received data item whereby to identify the symbol or combination of symbols carried by the predetermined portion thereof;

identifying whether at least one other portion of a header of said data item is carrying the same symbol or combination of symbols; and in the event that it is identified that at least one other portion of a header of said data item is carrying the same symbol or combination of symbols, processing at least one of said one or more headers according to a second pre-defined communication protocol, said second communication protocol differing from said first communication protocol.

Preferred embodiments relate to such a method being performed in respect of just one header of the data item in question, in which case the method may be defined as follows:

A method of obtaining information from a header of a data item transmitted via a communication network, a predetermined portion of the header carrying a symbol or combination of symbols having a first pre-defined meaning according to a first pre-defined communication protocol, the method comprising:

inspecting the header of a received data item whereby to identify the symbol or combination of symbols carried by the predetermined portion thereof;

identifying whether at least one other portion of the header of said data item is carrying the same symbol or combination of symbols; and in the event that it is identified that at least one other portion of the header of said data item is carrying the same symbol or combination of symbols, processing the header according to a second pre-defined communication protocol, said second communication protocol differing from said first communication protocol.

It will be understood that processing a header according to a particular protocol may involve, or may be regarded as involving, interpreting the header according to the semantics of the protocol and processing the header accordingly, in order to obtain information from it.

It will be understood that a symbol may be, for example, a digit, a letter, a non-alphanumeric character, or a combination of any of these. This may depend on the type of data item, the type of header, the applicable communication protocol, and other factors, for example. In many communication protocols, the symbols are referred to as codepoints, each of which may be a single- or multi-digit number in binary, decimal, hexadecimal, or other such numbering system. Each codepoint or other such symbol may have a particular meaning according to a particular protocol. It is not necessary for each to have a different meaning—in some protocols, two or more symbols may be assigned the same meaning.

According to preferred embodiments, the step of processing the at least one of the one or more headers according to a second pre-defined communication protocol may comprise processing at least one of the identified instances of the symbol or combination of symbols itself according to the second pre-defined communication protocol by interpreting it as having a second pre-defined meaning, the second meaning differing from the first meaning.

According to preferred embodiments, the first pre-defined meaning of the symbol or combination of symbols may be that data carried in one or more predetermined data fields in the at least one header should be processed according to the first pre-defined communication protocol, and the second pre-defined meaning of the symbol or combination of symbols may be that data carried in the one or more predetermined data fields in the at least one header should be processed according to the second pre-defined communication protocol.

According to preferred embodiments, the communication network may be a digital network such as a packet network.

The predetermined portion of the at least one header may comprise one or more fields or parts of fields in a header of the data item. Alternatively, the predetermined portion may comprise one or more sub-headers or parts of sub-headers in a header of the data item. In this regard, it will be understood that sub-headers may be what are termed "option headers" within certain contexts, such as TCP time-stamping, for example. Alternatively, the predetermined portion may comprise one or more 'Options' fields in the data item. Other versions of the "predetermined portion" are possible.

According to preferred embodiments, the data item in question may be, comprise, or be included in an Internet Protocol packet. Alternatively or additionally, the data item in question may be, comprise, or be included in a Transmission Control Protocol segment.

According to preferred embodiments, the first and/or second pre-defined communication protocols may relate to time-stamping.

According to preferred embodiments, the first pre-defined meaning of the symbol or combination of symbols may be that data carried in the one or more predetermined data fields should be processed according to an existing communication protocol allowing determination of round-trip time, and/or that the second pre-defined meaning of the symbol or combination of symbols may be that data carried in the one or more predetermined data fields should be processed according to a second pre-defined communication protocol allowing determination of one-way-trip time. It should be noted that "one-way-trip time" is also referred to as "one-way delay".

According to preferred embodiments, the method may further comprise processing the at least one header according to the first pre-defined communication protocol in the absence of an identification that another portion of a header of the data item is carrying the same symbol or combination of symbols.

According to a second aspect of the present invention, there is provided apparatus for obtaining information from one or more headers of a data item transmitted via a communication network, a predetermined portion of at least one header carrying a symbol or combination of symbols having a first pre-defined meaning according to a first pre-defined communication protocol, the apparatus comprising:
  a header reader module operable to inspect at least one header of a received data item whereby to identify the symbol or combination of symbols carried by the predetermined portion thereof;
  a processor module operable to identify whether at least one other portion of a header of said data item is carrying the same symbol or combination of symbols, and in the event that at least one other portion of a header of said data item is identified as carrying the same symbol or combination of symbols, to process at least one of said one or more headers according to a second pre-defined communication protocol, said second communication protocol differing from said first communication protocol.

The various options and preferred embodiments referred to above in relation to the first aspect are also applicable in relation to the second aspect.

According to preferred embodiments, the idea is for a sender to repeat a widely accepted protocol option that would not previously have been expected to be repeated. Such repetition can therefore act as a covert signal indicating to the receiver that one or both of the repeated fields should be interpreted with new semantics. Note that only the type of the protocol option is repeated, not necessarily all the parameters which may have different values.

A receiver that understands the new protocol will be arranged to detect the repetition and interpret the modified semantics of the repeated-fields in the appropriate way.

A receiver that has not been updated to understand the new protocol will read the first occurrence, act on it, then read the second occurrence and act on it, and so on, most probably without noticing it has processed a similar option already.

(The phrase "without noticing" is used here in the sense that the behaviour of such a receiver is not affected by such repetition.)

The repeated fields can be arranged so that, when processed by a receiver that has not been updated to understand the new protocol, the last field processed will achieve a desirable and safe outcome, even though the new protocol semantics have not been understood.

Note, however, there is a risk that variations in pre-existing software will lead to unpredictable results. For instance:
  One type of software might read in all protocol fields before using any of the values, causing only the second repeated field to be used
  Another type might use each value after reading it, causing both the repeated values to be used one after the other.

An aim of preferred embodiments is to be able to circumvent problematic middleboxes that have been set up to work only with known protocols such that they will interfere with newly-introduced protocol options. By merely repeating widely-recognised protocol options, such middleboxes will generally just work their way through the list of options and not "notice" that one option is repeated. To them, a "new protocol" packet header will be indistinguishable from pre-existing packet headers. It is therefore likely that such a method for introducing new protocol semantics will not hit problems with bugs and security checks on these problematic middleboxes.

It should be noted that Yourtchenko's idea (discussed above) does not use the existence of repetition itself as the signal that a second packet has new semantics. The second packet has a different format that an updated receiver can recognise even if the first packet is lost, while a legacy receiver would consider it invalid. The first packet is merely sent as a fall-back if the second packet is not understood. While Yourtchenko's idea uses a second packet which is (generally) related to the first, embodiments of the present invention repeat a protocol field within a particular data unit (i.e. a particular packet, segment, datagram, etc.).

The disclosures thought by the inventors to be most closely-related generally detect repetition of protocol fields as errors or attacks, not as deliberate protocol extensions.

No other references to the use of duplicate or repeated protocol fields have been found for the purposes of protocol extension. The only references to header field duplication are concerned with establishing whether a repetition is an error or attack or whether the repetition is safe, e.g. U.S. Pat. No. 7,342,892.

BRIEF DESCRIPTION OF THE DRAWINGS

A preferred embodiment of the present invention will now be described with reference to the appended drawings, in which:

FIG. 1(a) indicates how a TCP header may include repeated TCP Timestamp Option (TSopt) headers;

FIG. 1(b) shows a TCP Timestamp Option Sequence Diagram involving interactions between an Updated Originator (A) and a Traditional Responder (B);

FIG. 1(c) shows a TCP Timestamp Option Sequence Diagram involving interactions between an Updated Originator (A) and an Updated Responder (B), operating according to a preferred embodiment;

FIG. 2 shows a TCP Timestamp Option Sequence Diagram in a scenario where data units pass between transport endpoints $A_t$ and $B_t$ via Network Interface Cards $A_i$ and $B_i$;

FIG. 3 is a flow diagram indicating how timestamp values may be read from a packet on reception at a receiver operating according to a preferred embodiment; and FIG. 4 is a flow diagram indicating how timestamp echo replies may be written when sending a packet to a receiver operating according to a preferred embodiment.

DESCRIPTION OF PREFERRED EMBODIMENTS OF THE INVENTION

With reference to the accompanying figures, a method according to a preferred embodiment will be described that may be used to facilitate incremental deployment of a new protocol without causing or increasing the likelihood of the types of problems such as those described above that often occur when a new protocol is deployed.

To show an example of how to implement the use of a second/multiple TCP Timestamp Options (TSopt), we will first provide some background knowledge on TCP and the TSopt.

Reliable Transport with TCP

TCP provides reliable transport of data. That means whenever a packet gets lost on a link, TCP ensures that the data will be retransmitted. To detect losses a TCP receiver sends acknowledgments for successfully received packets. Each packet carries a sequence number in the header to differentiate the data. Moreover, the TCP header has an ACK flag to label an acknowledgment and an acknowledgment number field to indicate the next expected sequence number at the receiver side. (To decrease network and computation load, a TCP receiver will usually only send an acknowledgment for every second packet and thus acknowledge the data of both packets in one ACK packet. These are called delayed ACKs.)

TCP Connection Set-Up

TCP is a connection-oriented protocol. Before any data can be sent, both communication end-points need to agree to set up a connection. For this purpose a TCP end-point will send an initial TCP packet without any payload/data, only carrying a header that will indicate the start of a connection by setting the synchronise (SYN) flag. A TCP receiver that agrees to establish this connection will reply with another TCP packet without payload/data. To acknowledge the reception of the SYN packet and indicate the start of a new connection the receiver will set the ACK flag and the SYN flag in the header of this packet. Before any data can be sent the initiator (the sender of the initial SYN packet) will need to send one more packet without payload/data with the ACK flag set to complete this 3-way handshake.

TCP Options

Additional to a certain set of fixed fields and flags (like SYN, ACK or the sequence number field), it is possible to assign optional fields to the TCP header. Each TCP option must have an Option-Kind (1 byte) field that indicates the type of option. All TCP options except types 0 and 1 must have an Option-Length (1 byte) field indicating the length of the option header (including the type and length). The remaining bytes can be used for any option data to enable additional TCP functionality.

TCP Timestamp Options (TSopt)

The TCP Timestamp Option is one specific TCP option with the type 8 and a length of 10, The TSopt holds two 4 byte fields called the TS Value (TSval) and TS Echo Reply (TSecr) field. The TSopt is intended to be used to estimate the Round-Trip Time (RTT) of a connection. This is done the following way: Host A will put a timestamp recording when it sent the segment in the TSval field and host B will copy this value (or the earliest value of a non-ack'ed segment) into the TSecr field of the next ACK packet it returns to host A. The timestamp option field is used by the two half-connections in both directions (A to B and B to A), therefore host B puts a timestamp in the TSval field of the ACK to record the time it sent the ACK. When host A receives the ACK packet, it can compare the echo of the timestamp it sent to the current time and thus estimate the RTT without holding any records of when it sent packets. For the initial SYN packet in TCP the TSecr field will be zero as no previous timestamp was received.

Reporting Time Received Using Repetition of TSopt Headers

On the one hand, if a TCP host wants to measure RTT it can use the regular TSopt. It will then add the original standard option header to the TCP header of every packet.

If, on the other hand, a TCP host needs to measure one-way delay as well as RTT, it can avoid problems with introducing a new protocol by reporting send-timestamps in one TSopt header and reporting receive-timestamps in an additional TSopt header. Host A will add another TSopt header but use the TSval and the TSecr field of one of them differently to how the TCP timestamp standard originally specified. That means host A will still set the Option-Kind field to type 8, and the option will still have a length of 10 bytes, but the TSecr field of the additional TSopt header will carry the additional receive-timestamp. We will use the postfix -r and -s to distinguish the respective receive and send timestamps (see FIG. 1(a). Therefore we will call the additional receive-timestamp field TSecr-r.

When host B receives a segment with two or more TSopt headers, there are two possible outcomes:

Outcome 1: Host B has not been updated to be aware of the use of repeated TSopt with different semantics (FIG. 1(b). Thus host B will assume that all headers are regular TSopts and store one of the TSval fields to echo. Which one will be stored will depend on the implementation, but most likely the earlier value will simply be overwritten if another TSopt header arrives.

Outcome 2: Host B is aware of the use of multiple TSopt with different semantics and knows the semantic of the additional TSopt (FIG. 1(c). For the standardised TSopt, host B will echo the incoming TSval-s correctly in the outgoing TSecr-s. For the receive-timestamp, host B will insert a second TSopt in which the TSecr-r field holds a timestamp recording the time of arrival of the data packet that triggered host B to send the present packet. When host A gets these timestamps it can compare the initial sending timestamp in the TSecr field of the original TSopt with the receive-timestamp in the TSval field of the repeated header. If the clocks of hosts A and B are synchronised host A can estimate the one-way delay. Whether or not clocks are synchronised, host A can monitor the evolution of the one-way delay in comparison with other measurement samples which is usually sufficient, e.g. for congestion control.

Thus, the RTT calculation uses the send-timestamps in the originally specified way, whereas a host can use the receive-timestamps to measure one-way-delay (OWD) of packets it sends. We now use the timestamps in the protocol time-sequence diagram of FIG. 1(c) to give examples of the relevant calculations.

When the SYN/ACK arrives at host A at time t4, host A calculates $$RTT = t4 - t1$$

using the TSecr-s value of t1 in the arriving packet. Host A can also calculate $$OWD = t2 - t1$$

using the TSecr-r value of t2 in the arriving packet as well.

When the ACK arrives at host B at time t6, host B can similarly calculate:

$$RTT = t6 - t3;$$

$$OWD = t4 - t3.$$

The additional TSopt header does not have to appear at any specific position before or after the original header but we recommend having the original TSopt as the latest position as it is most likely that a non-updated host will echo this one.

An optimisation is sensible where the repetition must be immediate to be considered a signal that the first field has different semantics than if it occurred alone. Without this optimisation, no field can be processed until every field has been read to check whether there are any repetitions. With this optimisation, a field can be processed as soon as the type of the next field has been read.

Unlike the TSopt for send-timestamps, the receive-timestamp TSopt does not strictly need space for two timestamps. However, the TSopt for receive-timestamps should mimic the length of the send-timestamp field in order to reduce the chances of a middlebox rejecting it.

The apparently redundant TSval field in the additional TSopt header seems to be wasted. However, it can be put to good use where specialised receive-timestamping hardware is available in the network interface card (NIC). This is illustrated in FIG. 2, in which each packet is sent between the two transport endpoints $A_t$ and $B_t$, but they are forwarded through respective network interface cards $A_i$ and $B_i$, each of which provides a hardware timestamping facility.

As an example, we will focus on the SYN/ACK packet sent at time t5 in FIG. 2. This packet arrives at the network interface card (NIC) of host A at time t7, so the NIC stamps the receive-timestamp value t7 into the TSval-r field. When this packet arrives at host A's transport function ($A_t$), it reads the two TSecr values (TSecr-r=t3 and TSecr-s=t1) and uses them in the calculations for RTT and OWD as already defined above. At time t9, when host A sends the ACK triggered by this packet, it copies the two incoming values TSval-r and TSval-s into the two outgoing values TSecr-r and TSecr-s respectively, and it stamps the send-timestamp t9 onto TSval-s. When this packet in turn arrives at the MC of host B, it stamps the receive time t11 into the TSval-r field and the process of reading and swapping timestamps repeats as before.

The NIC only timestamps incoming packets if the transport function instructs it to (through a call to the appropriate application programming interface (API)). Then the transport function mechanically follows the same reading and swapping actions without having to read the system clock to timestamp when packets arrive. If the transport function does not instruct the NIC to add receive timestamps, it ignores the incoming TSval-r field and measures the time each packet is received by reading the system clock, then writing this time into the TSecr-r field of the following outgoing packet.

With the initial TCP SYN packet the TSecr of both timestamp options needs to be zero to not break the semantics. If the sender wants to guarantee that a correct RTT estimation at the beginning of a connection can be derived, both occurrences of the TSval in the two option headers of the initial SYN should hold the same valid timestamp even though later in the session not all TSopt headers need to hold the same timestamp. This is because a sender will not typically know a priori if the respective receiver is updated to understand repeated headers.

If the sender sends an initial SYN packet with more than one TSopt and does not get an SYN/ACK response, the sender will retry after a certain time period. With the next SYN packet the sender should not use any repeated TSopt headers. If the sender has sent a SYN with multiple TSopt headers but the SYN/ACK carries only one TSopt header, the sender should not send additional TSopt header any more. Instead it should only send one header with the original semantics.

The embodiment described so far adds one additional timestamp option. If a different embodiment requires more than twice the space of the original TCP option header, a header such as the TCP timestamp option that had traditionally been used only once may be repeated more than once, each repetition potentially implying different semantics.

The flow diagrams in FIGS. 3 and 4 specify how a host reads the timestamp values TSval from repeated headers in an incoming packet into a memory array TS[i] (see FIG. 3). Then, when it sends the following outgoing packet, as long as more values exist in this stored array, it adds more timestamp option fields to the outgoing packet and writes the values from this array into their TSecr fields (see FIG. 4). Finally in FIG. 4, it writes the current time into the sending timestamp value TSval-s of the last timestamp option.

A second embodiment will now be described. In the definition of version 6 of the Internet protocol (IPv6), if the IPv6 packet is encapsulated (tunnelled) by another outer IPv6 header, there is no facility to specify that a newly defined hop-by-hop option header should be copied to the outer header. The relevant IETF specification that defines how IPv6 hop-by-hop option headers are treated by tunnel endpoints [RFC 2473] merely says that the decision as to whether to copy an IPv6 hop-by-hop option header to the outer header depends on the configuration of the tunnel endpoint. Therefore, if an existing tunnel endpoint encounters a packet with a new option header that it doesn't recognise, there is no mechanism to ask it to copy this newly defined header to the outer header. This second embodiment solves this problem by using the idea of header repetition to ensure that a newly defined IPv6 option header will be copied to the outer header of a tunnel.

The jumbogram IPv6 hop-by-hop option header has always been copied to the outer when it is encapsulated by an IPv6 tunnel endpoint. The jumbogram option header comprises a 1-byte option type of C2 (hexadecimal), a 1-byte option length field with value 4 (meaning 4-bytes) and a 4-byte field to specify the size of the jumbogram. We propose that, if a new hop-by-hop option header is required to be copied to the outer on tunnelling, rather than defining a new hop-by-hop option header, a second header with option-type C2 (jumbogram) can be added to the IPv6 packet. It is unlikely that any existing IPv6 router includes any check for repeated option types, given there has been no need so far. Therefore, repeating a jumbogram header should fool existing IPv6 tunnel endpoints into copying the repeated jumbogram header to the outer. The software for reading the value of the jumbogram field is highly likely to read the second jumbogram header without realising it has already read one, and then use only the last value it reads as the size of the jumbogram.

If more than 4 bytes of option header is needed, more headers with option-type C2 can be added multiple times. All but the last duplicate jumbogram header can be given newly defined semantics nothing to do with jumbograms, even though option-type C2 was originally specified to have the semantics of a jumbogram header.

IPv6 routers that have been updated to understand these repeated jumbogram option headers will include code to count any hop-by-hop option headers starting with option-type C2, and to act on each one in sequence with the appropriate semantics. For instance, a new standard may specify that:

the last header with option-type C2 in a packet has the semantics of a jumbogram header;
the penultimate header with option-type C2 in a packet has semantics Y;
the header with option-type C2 before this has semantics X, and so on, where semantics X and Y would be defined in the relevant new standard.

The invention claimed is:

1. A method of obtaining information from one or more headers of a data item transmitted via a communication network, a predetermined portion of at least one header carrying a symbol or combination of symbols having a first pre-defined meaning according to a first pre-defined communication protocol, the method comprising:

inspecting at least one header of a received data item whereby to identify the symbol or combination of symbols carried by the predetermined portion thereof;
identifying whether at least one other portion of a header of said data item is carrying the same symbol or combination of symbols; and
in the event that it is identified that at least one other portion of a header of said data item is carrying the same symbol or combination of symbols, processing at least one of said one or more headers according to a second pre-defined communication protocol, said second communication protocol differing from said first communication protocol.

2. A method according to claim 1 wherein said step of processing said at least one of said one or more headers according to a second pre-defined communication protocol comprises processing at least one of said identified instances of said symbol or combination of symbols according to said second pre-defined communication protocol by interpreting it as having a second pre-defined meaning, said second meaning differing from said first meaning.

3. A method according to claim 1 wherein said first pre-defined meaning of said symbol or combination of symbols is that data carried in one or more predetermined data fields in said at least one header should be processed according to said first pre-defined communication protocol, and said second pre-defined meaning of said symbol or combination of symbols is that data carried in said one or more predetermined data fields in said at least one header should be processed according to said second pre-defined communication protocol.

4. A method according to claim 1 wherein the communication network is a digital network such as a packet network.

5. A method according to claim 1 wherein the predetermined portion of said at least one header comprises one or more fields or parts of fields in a header of said data item.

6. A method according to claim 1 wherein the predetermined portion of said at least one header comprises one or more sub-headers or parts of sub-headers in a header of said data item.

7. A method according to claim 1 wherein the predetermined portion comprises one or more 'Options' fields in said data item.

8. A method according to claim 1 wherein the data item comprises an Internet Protocol packet.

9. A method according to claim 1 wherein the data item comprises a Transmission Control Protocol segment.

10. A method according to claim 1 wherein the first and/or second pre-defined communication protocols relate to time-stamping.

11. A method according to claim 1 wherein said first pre-defined meaning of said symbol or combination of symbols is that data carried in said one or more predetermined data fields should be processed according to an existing communication protocol allowing determination of round-trip time, and/or said second pre-defined meaning of said symbol or combination of symbols is that data carried in said one or more predetermined data fields should be processed according to a second pre-defined communication protocol allowing determination of one-way-trip time.

12. A method according to claim 1 the method comprising processing said at least one header according to the first pre-defined communication protocol in the absence of an identification that another portion of a header of said data item is carrying the same symbol or combination of symbols.

13. Apparatus for obtaining information from one or more headers of a data item transmitted via a communication network, a predetermined portion of at least one header carrying a symbol or combination of symbols having a first pre-defined meaning according to a first pre-defined communication protocol, the apparatus comprising:

a header reader module operable to inspect at least one header of a received data item whereby to identify the symbol or combination of symbols carried by the predetermined portion thereof;
a processor module operable to identify whether at least one other portion of a header of said data item is carrying the same symbol or combination of symbols, and in the event that at least one other portion of a header of said data item is identified as carrying the same symbol or combination of symbols, to process at least one of said one or more headers according to a second pre-defined communication protocol, said second communication protocol differing from said first communication protocol.

14. Apparatus according to claim 13 wherein the processor module is further operable to process said at least one header according to the first pre-defined communication protocol in the absence of an identification that another portion of a header of said data item is carrying the same symbol or combination of symbols.

* * * * *